Figure 2B:
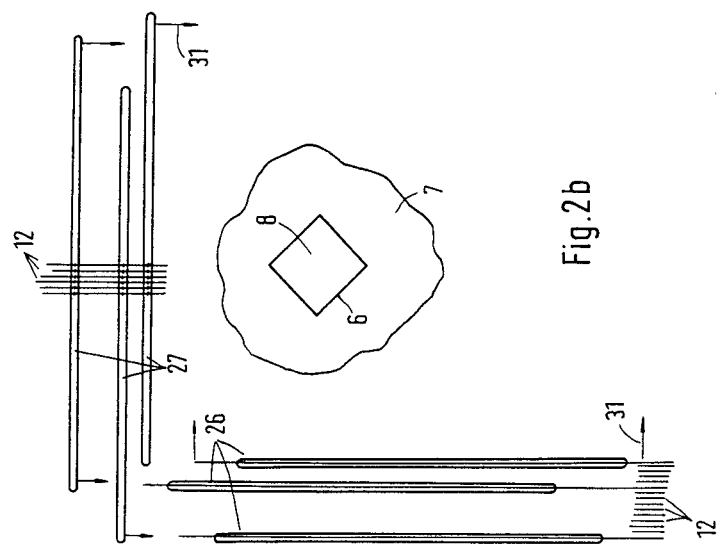

United States Patent [19]

Mattle

[11] Patent Number: 4,551,748
[45] Date of Patent: Nov. 5, 1985

[54] MEASURING HEAD FOR DETERMINING THE COLOR PURITY AND THE CONVERGENCE IN A COLOR PICTURE TUBE

[75] Inventor: Hans P. Mattle, Waiblingen, Fed. Rep. of Germany

[73] Assignee: International Standard Electric Corporation, New York, N.Y.

[21] Appl. No.: 467,121

[22] Filed: Feb. 16, 1983

[30] Foreign Application Priority Data

Feb. 26, 1982 [DE] Fed. Rep. of Germany ....... 3206913

[51] Int. Cl.⁴ ............................................. H04N 9/62
[52] U.S. Cl. ..................................................... 358/10
[58] Field of Search ........................................... 358/10

[56] References Cited

U.S. PATENT DOCUMENTS

| 3,309,459 | 3/1967 | Donigian | 358/10 |
| 4,159,484 | 6/1979 | Strathman | 358/10 |
| 4,364,079 | 12/1982 | Pons | 358/10 |
| 4,441,120 | 4/1984 | Gerritsen | 358/10 |

Primary Examiner—Richard Murray
Attorney, Agent, or Firm—Donald J. Lenkszus

[57] ABSTRACT

A measuring head serving to determine both the color purity and the convergence in color TV picture tubes with a specially shaped diaphragm aperture, with the distance of the brightness sensors being adapted to the mutual spacing of the phosphor stripes, permits a wide positioning tolerance when placed in front of the screen of the picture tube. Moreover, to make the determination of the convergence more accurate, the output signal of the measuring head is such that it can be made independent of the influence of the intensity and of the time dependence of the brightness signals.

7 Claims, 14 Drawing Figures

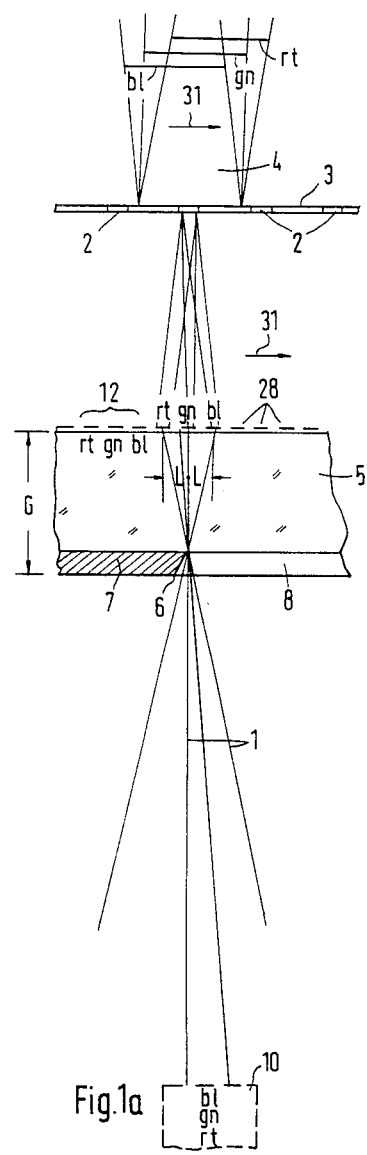
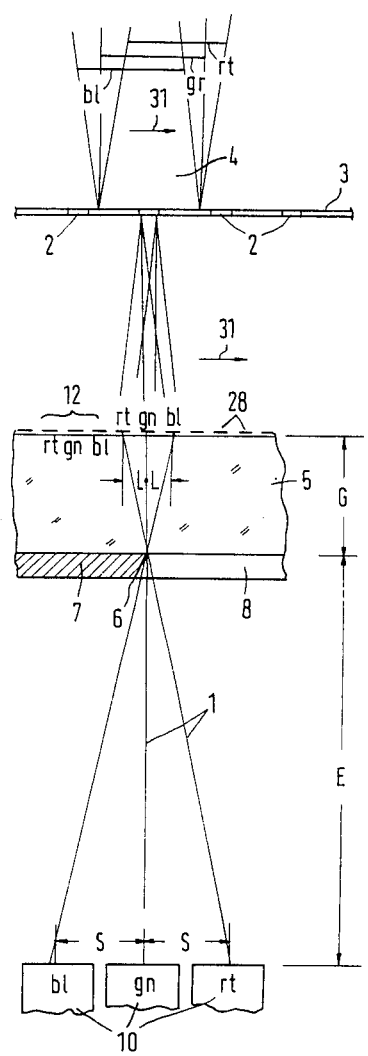
Fig.1a
Fig.1b

MEASURING HEAD FOR DETERMINING THE COLOR PURITY AND THE CONVERGENCE IN A COLOR PICTURE TUBE

The invention relates to a subject matter as set forth in the preamble of claim 1. This subject matter belongs to the field of automatizing production facilities and, in particular, to the field of measuring engineering as employed for adjusting color picture tubes, i.e. for adjusting the three electron beams which serve to excite the colors red, green and blue on the screen.

In a color picture tube with a shadow mask, the directions in which the electron beams pass through the apertures in the shadow mask, must exactly extend to their assigned phosphor stripes on the screen, in order to obtain color purity, and all three electron beams must converge, that is, must pass simultaneously through the same aperture in the shadow mask. By the term phosphor stripes there are here to be understood perpendicularly extending, stripe-shaped areas coated with phosphor, on the inside of the screen of a color television picture tube. These phosphor stripes extend either without any interruption, continuously throughout the entire screen height, or are arranged as square, round or rectangular phosphor areas which are interrupted and joined to one another. In their entirety, they form the screen of the color television picture tube.

Up to now, in the production of color television picture tubes, in the course of the manufacture, both the color purity and the convergence had to be adjusted manually, and readjusted, if necessary, in the quality control phase. In modern picture tube production, however, color purity and convergence are adjusted automatically with the aid of automatic control systems. For this purpose, measuring heads employing sensors are arranged in front of the screen of the color picture tube in order to obtain information relating to positional errors of the electron beams (beam deviations), and magnetizing arrangements on the neck of the picture tube are supplied with current pulses derived from this information, by which permanent magnetic rings arranged in or above the electron gun system of the color picture tube, are magnetized. The magnetizing patterns of these permanent magnetic rings (direction and intensity of magnetization on the circumference of the permanent magnetic rings), are influenced in the course of repeated control processes in the automatic control system "phosphor dot sensor electronic evaluating circuit pulse transmitter magnetizing device permanent magnetic ring beam deflection", until both the convergence and the color purity are adjusted.

For obtaining the required information it is desirable to have measuring heads which do not have to be exactly adjusted to any one group of phosphor stripes (each consisting of a red, green and blue phosphor stripe), or even in an exact position to an individual phosphor stripe.

In the conventional type of measuring head (DE-OS No. 31 13 454—E.Kienle-2), therefore, there is used as the criterion for the convergence the simultaneous visibility of phosphor stripes behind the diaphragm edge, excited by electron beams. The position of the measuring head, is not dependent on the position of a phosphor-stripe group.

For obtaining the information required for adjusting the convergence with the aid of the conventional measuring head, the electron beams are periodically deflected either vertically or horizontally by a few centimetres, so that each of the electron beams produces a narrow excited band (lightband). In the case of a misconvergence, at first neither the horizontal nor the vertical excited bands are congruent. Therefore, horizontal and vertical convergence must be adjusted. This is carried out subsequently to the adjustment of the color purity. For this purpose, the excited bands, rectangularly in relation to their longitudinal extension, and by way of a further, relatively slow deflection, are led past a small diaphragm aperture. This movement of the excited bands past the diaphragm is effected during the adjustment of the horizontal convergence by a horizontal movement of the vertical excited bands, and by a vertical movement of the horizontal excited bands during the adjustment of the vertical convergence.

Sensors of the measuring head, which are arranged behind the diaphragm, produce signals of increasing intensity when phosphor stripes are excited within the area of the diaphragm aperture, by the deflected electron beams, hence when an excited band enters the diaphragm aperture. In the event of a misconvergence, the signals as produced by the individual excited bands are shifted in relation to one another as a function of time. As indicators for the different time slots of the signals there are used separate threshold detectors with time counters connected thereto, for the red, green, and blue excited band. As soon as a signal exceeds a certain intensity threshold, a corresponding counter is started. The amount of time difference between a signal produced by a red or blue excited band and the signal produced by the green excited band serves as a measure of the deviation of the corresponding electron beam and, consequently, of the misconvergence. The time slot of the signals as supervised by the intensity threshold, is determined in the conventional measuring head not only—as is desired—by the location of deviation of the electron beam, but also by its cross-section, its beam current intensity and by the luminous intensity of the phosphor stripes, as well as by the sensitivity of the sensors, because the time position of exceeding the intensity threshold not only depends on the time slot of the signal, but also on its shape of curve and its intensity.

Moreover, in the case of the conventional measuring head, it is necessary to carry out a correction of the time slot of the signal wave-form, because the diaphragm edge of the measuring head when in its measuring position, not alway lies exactly between two groups of phosphor stripes. The position of the measuring head, however, shall not only be independent of the position of the phosphor-stripe groups, but also independent of the phosphor-stripe position, namely of the unavoidable positional differences of the red, green, and blue phosphor stripes of one and the same phosphor-stripe group, in order that the measurement can be carried out rapidly without having to adjust the measuring head. The prior art measuring head, therefore, is amended by a time-correction circuit which is assigned to the electronic evaluating circuit, and which considers the caused time differences in that the three colors are arranged next to each other on the screen.

It is the object of the invention to provide a measuring head which no longer requires a time correction and in which the sensor signals are intensity-independent, so that neither the separate position of the colors of a phosphor-stripe group has to be taken into consideration with the aid of a color-related time correction, nor that the recognition of the time slot of the sensor signals is affected in an unwanted way by disturbances of the signal intensity, such as by differences in the intensity distribution within the phosphor dot, different beam current intensities or unequal luminous intensities.

This object is achieved by the means set forth in the characterizing part of claim 1. Advantageous embodiments of the invention are set forth in the subclaims 2 to 7. By the solution according to the invention, the positional difference between the position of the phosphor stripes and the position of the diaphragm edge as accidentally resulting when positioning the measuring head in front of the screen of the color picture tube, is eliminated in that the sensors inside the measuring head are arranged at a corresponding spaced relation with respect to one another and the diaphragm, in such a way that each sensor, in any arbitrary position of the measuring head, is equally well illuminated by its associated phosphor stripe.

The influence of the beam current intensity and of the beam diameter as well as of the luminous intensity differences and the sensor sensitivity upon the information is eliminated by a corresponding shaping of the diaphragm aperture. The contours of the diaphragm aperture may be square, rhombic or trapezoidal, or else one diagonal or one of the parallel lines of the trapezoid of the diaphram aperture may be lying in parallel with the line on which the three sensors are arranged. This line is also supposed to extend perpendicularly in relation to the phosphor stripes. In this position of the diaphragm aperture, an excited band will then enter from the point end of the wedge-shaped diaphragm aperture into the diaphragm area, so that the signal wave-form as a function of time, is determined by the restriction of the diaphragm aperture which is expanded in a wedge-shaped manner in the direction of movement. Apart from the time until the complete entrance of an excited band into the diaphragm aperture, the rising shape of the signal is no longer of significance. As the last disturbing factor there still remains the intensity of the signal. When employing the shape of diaphragm and the sensor arrangement according to the invention, the intensity of the signals can be eliminated by a simple computing operation. For this purpose, the signal rise as determined by the angle of the diaphragm aperture, is linearized and extrapolated to 0. From a comparison of two zero-axis crossings of the signals produced by two excited bands, there will then result the exact time difference and, from that, in turn, there will result the wanted deviation of the electron beams.

The processing of the signals as received by the sensors is considerably simplified by the embodiment of the measuring head according to the invention, because it is not necessary to carry out a time correction. Positioning the measuring head in front of the screen of the picture tube remains to be simple, because no tolerance requirements have to be placed on the position of the measuring head. In mass production of color picture tubes this results in a simplification of the testing and measuring apparatus, and in an acceleration in the performance of the adjusting operation.

Another advantage of the invention resides in the fact that the type of measuring head according to the invention permits to adjust both the convergence and the color purity on the screen without having to change the position of the measuring head. Since the measuring head position is uncritical with respect to the position of the phosphor-stripe groups, there will advantageously also result the important possibility of checking with the same simple measuring head, quickly one at a time in turn, at several points of the screen, both the convergence and the color purity.

Figure 2A:
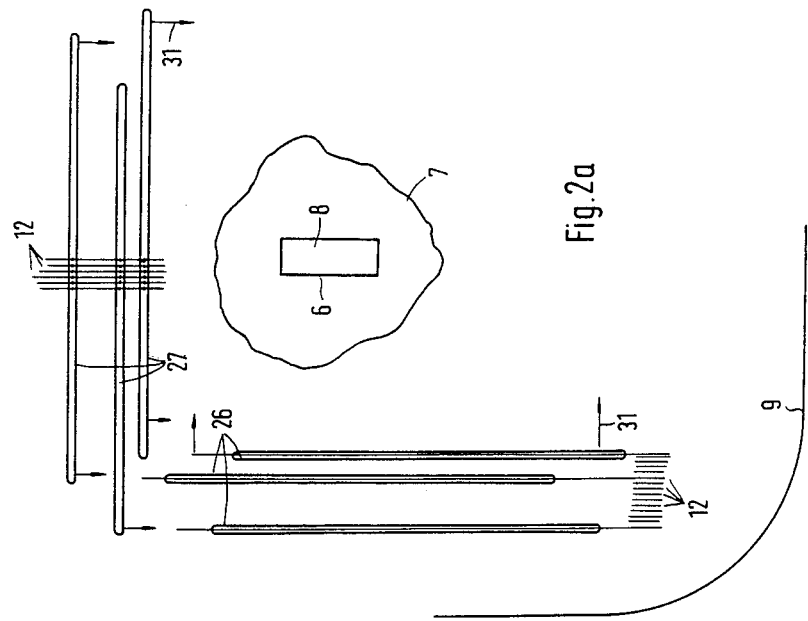
Figure 3:
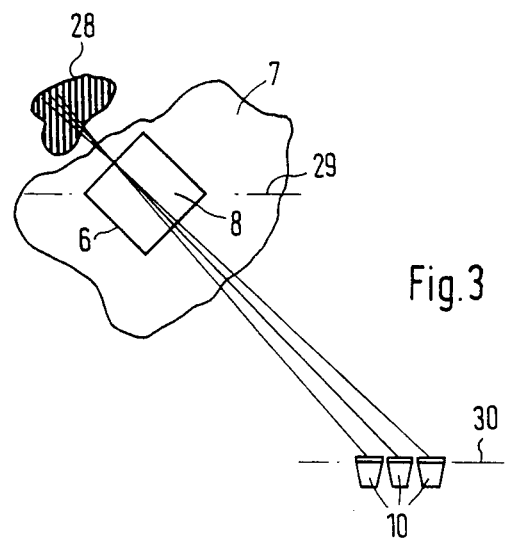
Figure 4:
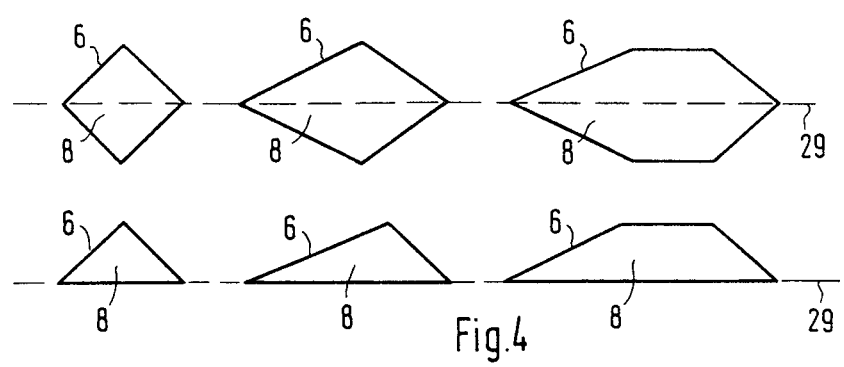
Figure 5A:
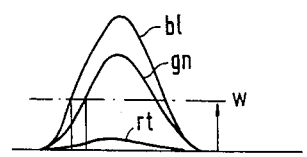
Figure 5B:
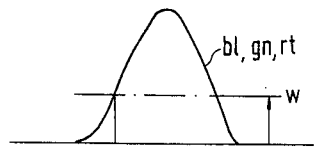
Figure 6A:
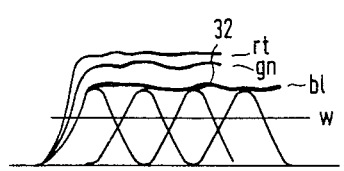
Figure 6B:
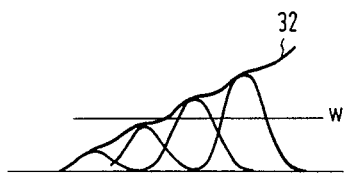
Figure 7:
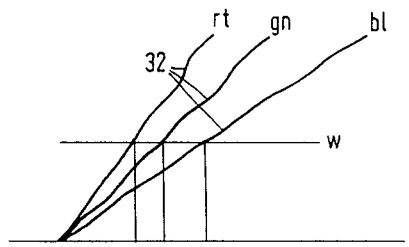
Figure 8:
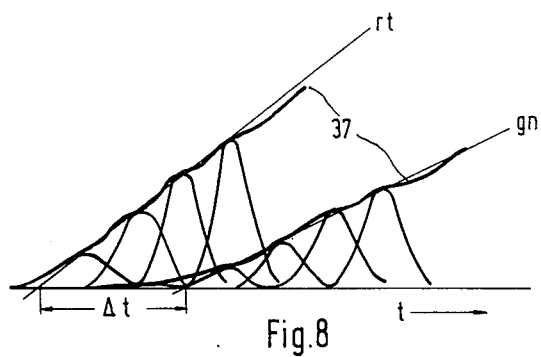
Figure 9:
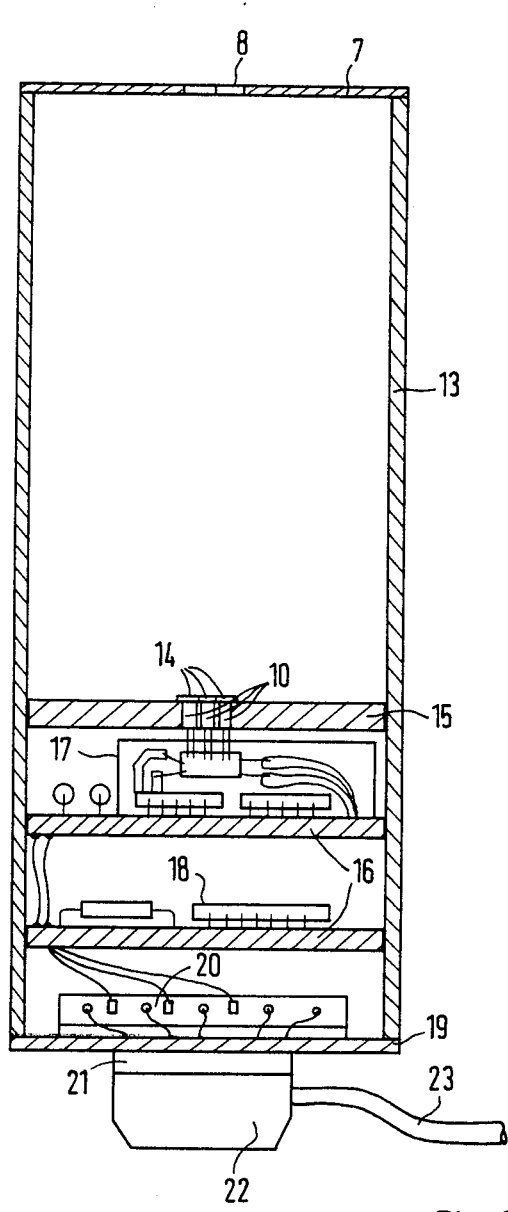
Figure 10:
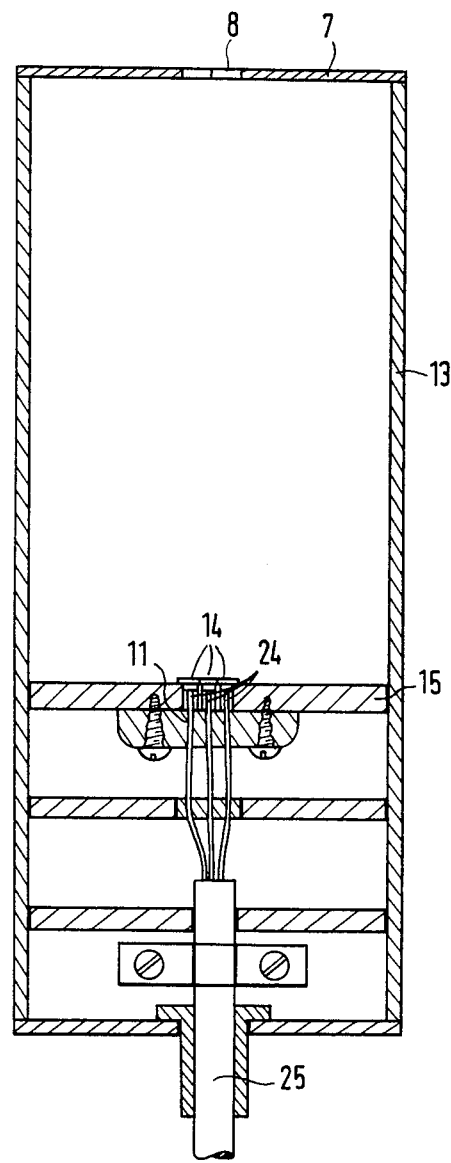

The invention as well as advantageous further embodiments thereof will now be explained hereinafter with reference to FIGS. 1 to 10 of the accompanying drawings, in which:

FIG. 1a in a schematical representation, shows the essential component parts of both the measuring head and the color picture tube according to the prior art, FIG. 1b, in a schematical representation, shows the essential component parts of both the measuring head and the color picture tube according to the invention, FIG. 2a shows one diaphragm aperture according to the prior art in relation to the excited bands on the screen, FIG. 2b shows a diaphragm aperture according to the invention in relation to the excited bands on the screen, FIG. 3 shows the sensors in relation to the diaphragm aperture, FIG. 4 shows various embodiments of the diaphragm aperture according to the invention, FIG. 5a shows the sensor signals produced by the phosphor stripes of a group of phosphor stripes, with the aid of a conventional measuring head, FIG. 5b shows the sensor signals produced by the phosphor stripes of a group of phosphor stripes, with the aid of measuring head according to the invention, FIG. 6a shows the total sensor signal produced by the phosphor stripes of several groups of phosphor stripes by employing a diaphragm aperture as shown in FIG. 2a (prior art), in one of the three color sensors, FIG. 6b shows the total sensor signal produced by the phosphor stripes of several groups of phosphor stripes by employing a diaphragm aperture as shown in FIG. 2b (invention) in one of the three color sensors, FIG. 7 shows the three total sensor signals in the case of convergence, FIG. 8 shows two total sensor signals in the case of a misconvergence, and FIGS. 9 and 10 each show an example relating to the construction of the measuring head, schematically and in a sectional view.

FIG. 1a shows part of the prior art measuring head which, for the purpose of producing the sensor signals, is positioned at any arbitrary point on the front screen of a color TV picture tube. The section of the screen 5 as shown in FIG. 1a, has a glass thickness G. On its rear side, the screen is provided with the groups of phosphor stripes 12 which each consist of a red, green and blue phosphor stripe 28 which are each spaced apart by the center distance L. A portion of the electron beams 4 passes through the openings 2 of the color-selection electrode 3. When both the color purity and the convergence are adjusted, the phosphor stripes are excited and thus illuminated by the electron beams produced by their assigned electron-gun systems. While adjusting the convergence, the diaphragm 7 is positioned in front of the screen 5. The light produced by the electron-beam excitation of the phosphor stripes is therefore only permitted to pass through the aperture 8 of the diaphragm 7 and to impinge upon the sensors 10 positioned inside the measuring head. The diaphragm edge 6 of the diaphragm aperture 8, in the course of this, covers up the phosphor stripes of one phosphor-stripe group to a differently strong extent. The sensors 10, which, in the prior art measuring head, are arranged above each other, are not struck by the light of the red phosphor stripe in the case of an assignment as shown in FIG. 1a, as is indicated by the connecting lines 1.

FIG. 1b shows the arrangement corresponding to that of FIG. 1a, but dimensioned in accordance with the invention. In this FIG. 1b, the connecting lines 1 show that when the distance diaphragm-sensor E and the mutual spacing of two sensors S are chosen in accordance with the relationship E/G=S/L, the phosphor stripes 28 of one phosphor-stripe group 12, always uniformly illuminate their assigned sensors 10, independently of the position of the diaphragm aperture on the screen. In the following, there will be described the shape of this diaphragm edge which, according to the invention, eliminates any further disturbing influences which affect the signal intensity.

Relative thereto, FIG. 2a shows a prior art diaphragm. The diaphragm aperture 8 is of rectangular shape and the diaphragm edge 6 as a restriction of this rectangle, consists of the longer sides extending in parallel with the phosphor stripes 12, and of the shorter sides extending perpendicular in relation thereto. Behind the diaphragm 7, for the purpose of adjusting the convergence, the excited bands 26 (for the horizontal convergence) and 27 (for the vertical convergence) are moved past it. This is effected by a relatively slow beam deflection in the direction as indicated by the arrows of movement 31.

FIG. 2b shows a corresponding representation relating to a diaphragm according to the invention. The diaphragm aperture is arranged in such a way that the excited bands, in the wedge-shapedly expanding diaphragm aperture 8, appear to the sensors 10 with an increasing length corresponding to the angle of opening (in this case, of 90°).

FIG. 3, schematically and in a perspective way, shows the assignment of phosphor stripes 28, diaphragm 7 and sensors 10. The reference numeral 29 indicates the diagonal of the diaphragm aperture, and the reference numeral 30 indicates the straight line extending through the sensor axes. The two lines 29 and 30 are parallel and extend perpendicular in relation to the phosphor stripes.

FIG. 4 shows various types of embodiment of the diaphragm aperture 8. The diaphragm edge 6 extends in such a way that the diaphragm aperture, in direction of the diagonal 29 and perpendicular in relation thereto, becomes continuously enlarged at least once within each partial area. The diagonal 29 may either be a line of symmetry, may coincide with a bordering line of the diaphragm aperture, or may only connect two corner points. The chief thing is that in the direction of the diagonal 29 and perpendicular in relation thereto, at least one portion of the diaphragm aperture is continuously enlarged, i.e. in the most simple case, in a straight-line fashion.

FIG. 5a shows the sensor signal wave-form as a function of time, as resulting when employing a prior art measuring head (FIGS. 1a and 2a), i.e. when the connecting line extending from the sensor to the diaphragm edge and relating to the measuring head as positioned on the screen, is not aligned exactly to the center between two groups of phosphor stripes. The representation applies to this and the following figures including FIG. 7, and on condition that the convergence of the electron beams has already been adjusted.

Since, in the state of convergence, the phosphor stripes red, green and blue are simultaneously excited through the same shadow-mask hole, the signals of the three sensors for the colors red, green and blue are in synchronism. The signals, however, have different intensities when the excited phosphor stripes are not all lying within the diaphragm aperture, thus causing the assigned sensors to be illuminated to an unequally strong extent. As a criterion for the time slot of the signal there is used, according to the prior art, the time position of exceeding an intensity threshold W. This time position, as can be recognized from FIG. 5a, is not only dependent on the time slot, but also on the intensity of the signal. The red phosphor dot which lies only partly in the diaphragm aperture, in the given example, only produces a weak signal, so that the red beam is evaluated as being not yet present in the respective shadow-mask hole.

In FIG. 5b it is shown how, with the arrangement according to the invention as shown in FIG. 1b, equally strong sensor signals are produced, and the apparent time-slot difference therefore disappears.

From FIG. 6a it can be seen how the sensor signals of several phosphor-stripe groups are added to form a total sensor signal 32 when using a shape of diaphragm as shown in FIG. 2a.

Moreover, the signal intensity is still disturbingly influenced by luminous-intensity differences among the phosphor stripes by different intensities of the red, green, and blue beams, by an unequal sensitivity of the red, green, and blue sensors, by a different weakening of the light owing to the use of color filters, etc., so that the threshold W is exceeded at different times also in the state of convergence.

FIG. 6b shows the wave-form of the total sensor signal 32 as resulting when a diaphragm with a continuous aperture as shown in FIG. 2b is used. In one corner of the continuously enlarging diaphragm aperture, at first a small amount of light of the excited band 26 is permitted to pass through the diaphragm (FIG. 2b); the amount of light, however, increases in proportion to the angle of aperture of the diaphragm, when the light of the phosphor-stripe sections as becoming increasingly longer, passes through the diaphragm aperture. Now, the total sensor signal, by way of extrapolation to zero, may be separated from disturbing intensity differences, so that the time slot of the total sensor signal can be determined without the aid of an intensity threshold.

FIG. 7 shows the wave-forms of three total sensor signals 32 relating to the three primary colors, which are registered in the state of convergence, but subjected to strong disturbances by intensity variations. An intensity threshold W would again indicate different time slots. The extrapolation of the total sensor signals, however, shows a common intersecting point on the time axis (t), i.e. a criterion for the convergence of the assigned electron beams which is independent of the intensity differences of the red, green, and blue signals.

The sensor signal wave-forms as shown in FIG. 8 indicate an existing misconvergence between the red and the green beams. The total sensor signals 32 for red and green are linearized and extrapolated up to the point of intersection with the time base. From the time difference $\Delta t$ between these two points of intersection and the speed of movement of the excited bands there will result the distance between the deviation of the red beam and of the green beam on the screen.

FIG. 9 is a longitudinal section taken through the measuring head. The housing 13 of the measuring head is terminated on one hand, by the diaphragm 7 with the diaphragm opening 8 and, on the other hand, by the rear wall 19. The sensors 10 with the color filters 14 are mounted on the base plate 15 and connected directly to the preamplifier 17 which, in turn, is connected to the master amplifier 18. The outputs of the master amplifier 18 extend to the connecting strip 20 from which the connections extend to the connector circuit 21 and, from there, further to the connector 22 via the cable 23, to an evaluating unit. The amplifiers are mounted on the intermediate boards 16. The diaphragm aperture 8 is of such design as is shown by way of examples in FIG. 4. The distances S and E as shown in FIG. 1, are chosen in accordance with the phosphor stripe distance L as well as in accordance with the glass thickness G of the front screen 5 of the color picture tube to be adjusted.

FIG. 10 shows a modified type of embodiment of the measuring head as shown in FIG. 9, in which the sensors are not accommodated inside the measuring head as such, but in the (not shown) remote evaluating unit. At the point at which in the other measuring head, the sensors are arranged, there are now positioned the ends of three glass fibers or bundles 24 of glass fibers. Through the glass fiber cable 25 the light signals are transmitted to the sensors, such as photomultipliers, as accommodated in the evaluating unit.

In both the manufacture and the quality control of color picture tubes, for observing the convergence, the electron beams are periodically deflected, so that each beam produces excited (light-) bands 26 or 27 in the colors red, green or blue. By way of an additional slower deflection, these phosphor bands are moved perpendicular in relation to the direction in which the excited bands extend. For producing the sensor signals, a measuring head is placed with its diaphragm 7 (cf. FIG. 1)in front of the glass of the screen 5. Thereafter, the convergence of the electron beams is adjusted in that the excited bands as produced by the red, green, and blue beams, are brought into alignment with one another. The electron beams converge in the plane of the color-selection electrode 3 which is also referred to as a shadow mask or briefly as a mask. Through the holes 2 of this mask, the electron beams impinge on their assigned phosphor stripes 28 of the phosphor-stripe group 12. On the other side of the diaphragm 7 there are arranged the sensors 40 which produce signals in accordance with the brightness of the phosphor stripes. In the prior art measuring head, the sensors are arranged at a not particularly defined spacing from the diaphragm. In the measuring head according to the invention, the sensors are arranged in one line next to each other, separated from one another by the center distance S, and at the spacing E from the diaphragm. This spacing E, according to the invention, results from a suitably selected center distance S of the sensors, from the glass thickness G of the screen, and from the center distance L of the phosphor stripes in accordance with the relationship $E = G \cdot (S/L)$. Compared to the phosphor stripes 28, the color sequence of the sensors is in the opposite sense, so that the imaginary connecting lines 1 (FIG. 1b) each extend between phosphor stripes and sensors assigned in terms of color.

When the electron beams are jointly further deflected in the direction as indicated by the arrow 31, they pass successively through further holes 2 in the mask 7 and, in the state of convergence, permit the three colors of the respective assigned phosphor-stripe group to illuminate simultaneously. In the course of this, a sensor 10 of the prior art measuring head, as is shown in FIG. 1a, upon lighting of the phosphor stripes 28 of the phosphor-stripe group as simultaneously illuminated through the hole of the shadow mask, would produce unequally strong signals from the three phosphor stripes, because the diaphragm edge 6 almost completely covers up the red phosphor stripe as well as a small portion of the green one, while the blue phosphor stripe is fully visible (cf. FIG. 5a).

In distinction thereto, in a measuring head according to the invention comprising sensors arranged at a spacing $E = (G/L) \cdot S$ with the center distance S, there are produced the identical sensor signals for the three colors as shown in FIG. 5b. Accordingly, when the electron beams are in the state of convergence, there is established a simultaneousness of the sensor signals produced thereby. Provided that these sensor signals not only have the same time slot, but also the same intensity, they exceed a threshold value W, i.e. all simultaneously, with this being considered as a sign of convergence.

Dimensioning the measuring head in accordance with the invention, at first has the effect that the light coming from the phosphor stripes lying next to one another of a phosphor-stripe group, impinges simultaneously upon the sensors. In as far as the thus produced simultaneous signals also have the same intensity and the same waveform as a function of time, there does not occur any fault which would be likely to disturb the convergence indication.

In reality, however, the intensity of the sensor signal is disturbingly influenced, amongst others, by luminous-intensity differences between differently colored phosphor stripes, by deviations of the beam current intensities of the electron beams, by varying (unequal) sensor sensitivities and by color filter attenuations.

There is also disturbed the similarity in the waveform of the signals, e.g. by differences in the beam diameters and by the differences in the current distribution throughout the beam cross-sections, as well as by unequally wide phosphor stripes.

Therefore, the shape of the diaphragm aperture has been designed in such a way that the aforementioned influences no longer have any disturbing effects. This is accomplished by the diaphragm apertures of which some examples of embodiment are shown in FIG. 4. FIG. 3 shows an example of the arrangement according to the invention. The line 30 on which the sensors are arranged, extends parallel in relation to the diagonal of the diaphragm aperture. The line 30 always extends perpendicular in relation to the phosphor stripes. When the diaphragm opens in a wedge-shaped manner in the direction of movement of the excited bands, there is eliminated the influence of the different rise forms of the signal curves and of the intensity differences upon the sensor signals. This effect of the wedge-shaped diaphragm apertures is explained with reference to FIGS. 6b through 8 of the accompanying drawings.

By the moving excited (light-) band, the phosphor-stripe groups are excited one at a time in turn through the mask holes. In the course of this, the signals as produced by the individual phosphor stripes are added to form the total sensor signal 32 (cf. FIG. 6a). This total sensor signal according to FIG. 6a is produced with the aid of a diaphragm of the prior art measuring head as shown in FIG. 2a, having an aperture restricted in a straight line perpendicular in relation to the direction of movement of the excited bands. From the use of a wedge-shapedly opening diaphragm (2b) there results the continuously increasing wave-form of the total sensor signal 32 for each color, as shown in FIG. 6b.

With such a summation of the produced individual signals according to FIG. 6b, their contour of rise is to a large extent equalized, so that these interferences having effects upon the rise, and affecting the time of exceeding the threshold value W, are eliminated.

There is also to be eliminated the interference which results owing to the fact that the wave-form of the total sensor signal 32 is affected by differences, for example, in the beam current intensity of the electron beam, by the sensitivity of the sensors and by the color-filter attenuation. FIG. 7 shows the total sensor signal of all 3 colors, with the individual signals having different intensities. The time-dependent differences in the excitation of the phosphor stripes are indicated by the zero-axis crossings of the linearized and extrapolated total sensor signals. In the state of misconvergence, one obtains zero-axis crossings at different times (cf. FIG. 8). The time difference $\Delta t$ indicates the "deviation" of an electron beam, for example, in relation to an electron beam used as a reference beam.

FIG. 9 shows an advantageous embodiment of the mechanical structure of a measuring head according to the invention. The weak sensor signals are "boosted" by a preamplifier 17 which is arranged directly near the sensors, beyond the ambient noise level. When the noise is chiefly of an electrical nature, the thus resulting impairment according to FIG. 10, can be eliminated in that glass fibers 11 are provided instead of the sensors, which pick up the light signals and transfer them to the sensors as accommodated in the remote evaluating unit. This is particularly favourable in cases where larger photomultipliers are used instead of small semiconductor detectors as sensors. Also the color filters 14 may then be arranged at the end of the glass fiber cable 25 near the electronic evaluating circuit. Instead of the color filter or between the color filter and the sensors there may also be provided an optical matching arrangement which is required, in particular, when employing semiconductor light amplifiers at both the beginning and the end of a glass fiber cable.

I claim:
1. A measuring head for determining the convergence and the color purity of a color TV picture tube having phosphor areas arranged in the form of stripes, comprising
    a diaphragm with a diaphragm aperture;
    a housing for said measuring head;
    a base plate carrying a plurality of sensors, including one sensor each for the colors red, green, and blue, said sensors are spaced apart from each other, the center-to-center distance between adjacent sensors being the distance S, said sensors are arranged in one line at a distance E=G S/L from said diaphragm wherein G is the glass thickness of the front screen of said TV picture tube and L is the center-to-center distance of adjacent ones of said stripes; and
    at least one portion of said diaphragm aperture is wedge-shaped in two directions perpendicular in relation to one another.
2. A measuring head as in claim 1 wherein:
    each sensor of said plurality of sensors comprises a photodiode.
3. A measuring head as in claim 2 wherein:
    each sensor of said plurality of sensors further comprises a color filter to match the sensor to one of the colors of the screen.
4. A measuring head as in claim 1 wherein each sensor of said plurality of sensors comprises;
    a photomultiplier sensitive to one of said colors.
5. A measuring head as in claim 1 wherein each sensor of said plurality of sensors comprises;
    a semiconductor light amplifier.
6. A measuring head as in claim 1 comprises:
    optical matching means coupled to said plurality of sensors.
7. A measuring head as in claim 6 comprises:
    optical transforming means including optical fiber bodies coupled to said optical matching means.

* * * * *